United States Patent [19]

Somerfield

[11] Patent Number: 5,842,360
[45] Date of Patent: Dec. 1, 1998

[54] AUTOMOBILE SECURITY DEVICE

[76] Inventor: Alan David Somerfield, 10 Barley Mow Passage, Chiswick, London, United Kingdom, W4 4PH

[21] Appl. No.: 515,746

[22] Filed: Aug. 16, 1995

[30] Foreign Application Priority Data

Aug. 17, 1994 [GB] United Kingdom ............... 9416640

[51] Int. Cl.⁶ ............................................. B60R 25/02
[52] U.S. Cl. .............................. 70/209; 70/226; 70/237
[58] Field of Search .................... 70/209, 211, 212, 70/225, 226, 237, 238

[56] References Cited

U.S. PATENT DOCUMENTS

| | | | |
|---|---|---|---|
| 1,228,123 | 5/1917 | McDermott | 70/212 |
| 1,368,054 | 2/1921 | Recher | 70/212 |
| 1,395,532 | 11/1921 | Tilden | 70/209 |
| 3,982,602 | 9/1976 | Gorman | 70/212 X |
| 4,699,238 | 10/1987 | Tamir | 70/238 X |
| 5,121,617 | 6/1992 | Chen | 70/209 |
| 5,144,822 | 9/1992 | Jan et al. | 70/226 X |
| 5,199,283 | 4/1993 | Chen | 70/209 |
| 5,275,030 | 1/1994 | Cole | 70/209 |
| 5,297,406 | 3/1994 | Lin | 70/209 |
| 5,415,018 | 5/1995 | Ferrante | 70/209 |
| 5,452,597 | 9/1995 | Chen | 70/209 |
| 5,540,067 | 7/1996 | Kim | 70/209 |
| 5,555,753 | 9/1996 | Matlocck | 70/209 |
| 5,595,078 | 1/1997 | Harrell | 70/237 X |
| 5,605,063 | 2/1997 | Taurog | 70/209 |
| 5,613,383 | 3/1997 | Banez | 70/226 X |
| 5,613,384 | 3/1997 | Weber et al. | 70/226 X |
| 5,619,873 | 4/1997 | Wood | 70/237 X |
| 5,666,832 | 9/1997 | Cunningham | 70/209 |

FOREIGN PATENT DOCUMENTS

| | | | |
|---|---|---|---|
| 919367 | 3/1947 | France | 70/212 |
| 42412 | 2/1926 | Norway | 70/211 |
| WO 92/04211 | 3/1992 | WIPO | 70/238 |

*Primary Examiner*—Lloyd A. Gall
*Attorney, Agent, or Firm*—Arter & Hadden LLP; Thomas E. O'Connor; S. Paige Christopher

[57] ABSTRACT

A security device for a motor vehicle comprising a cover adapted to be fitted over a portion of the steering wheel of the vehicle including at least one spoke and a portion of the steering wheel rim so as to render the cover irremovable by cutting any combination of the uncovered portions of the steering wheel, a locking mechanism cooperating with the cover and an extension from the cover to foul a driver's ability to operate the steering wheel. The locking mechanism further comprises a locking pin or pins and/or a lid to prevent rotation of the device relative to the steering wheel together with an extension from the cover to inhibit a driver from using the steering wheel when the security device is mounted.

4 Claims, 10 Drawing Sheets

AUTOMOBILE SECURITY DEVICE

BACKGROUND OF THE INVENTION

The present invention relates to security devices for preventing theft of motor vehicles.

There are many known mechanical security devices which are fastened to the steering wheel of a vehicle in such a way that unauthorized driving of the vehicle is prevented. Many of these devices leave the steering wheel itself exposed to attack so that by cutting the steering wheel rim or spokes in certain places the security device can be easily removed from the wheel and a vehicle then driven away using the remaining part of the wheel. Additionally it is possible to remove a car by totally removing the steering wheel and driving the car using wrenches gripping the central nut of the steering column.

There are also known devices which completely cover the steering wheel making it difficult to cut the wheel at any point or to unscrew the wheel from the steering column. The main problem of the latter devices is that as they cover the entire steering wheel their consequent size, weight and cost makes them less likely to be used on a day-to-day basis.

SUMMARY OF THE INVENTION

The present invention is concerned with these problems and an embodiment of the invention provides a steering wheel attachment which both protects enough of the steering wheel against attack to render unauthorized removal very difficult and which is of a compact design which is both light and easy to use.

In accordance with the present invention there is provided a security device for a motor vehicle comprising:

- a cover adapted to be fitted over a portion of the steering wheel of the vehicle including at least one spoke so as to render the cover irremovable by cutting any combination of the uncovered portion of said steering wheel;
- means for preventing rotation of the device relative to the steering wheel rim to expose a spoke protected by the cover; and
- means for inhibiting a driver from using the steering wheel when the security device is mounted on the wheel.

BRIEF DESCRIPTION OF THE DRAWINGS

In order that the present invention may be more readily understood embodiments thereof will now be described by way of example and with reference to the accompanying drawings, in which.

DETAILED DESCRIPTION OF THE PREFERRED EMBODIMENTS

Figure 9A:
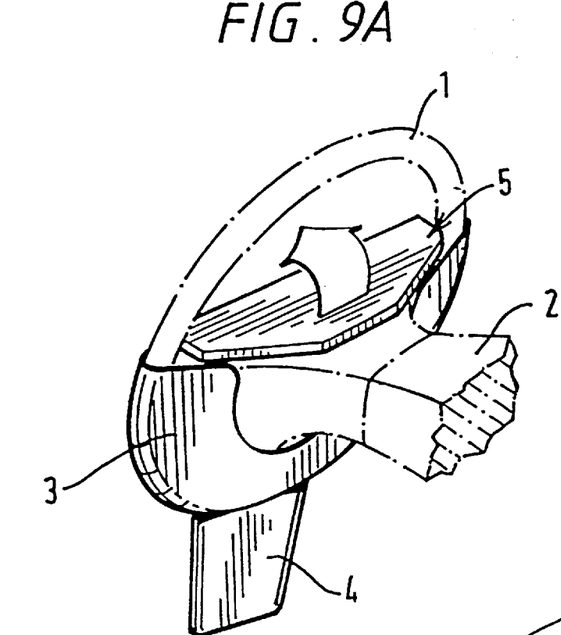
FIGS. 9A–B shows a second embodiment.
Figure 9B:
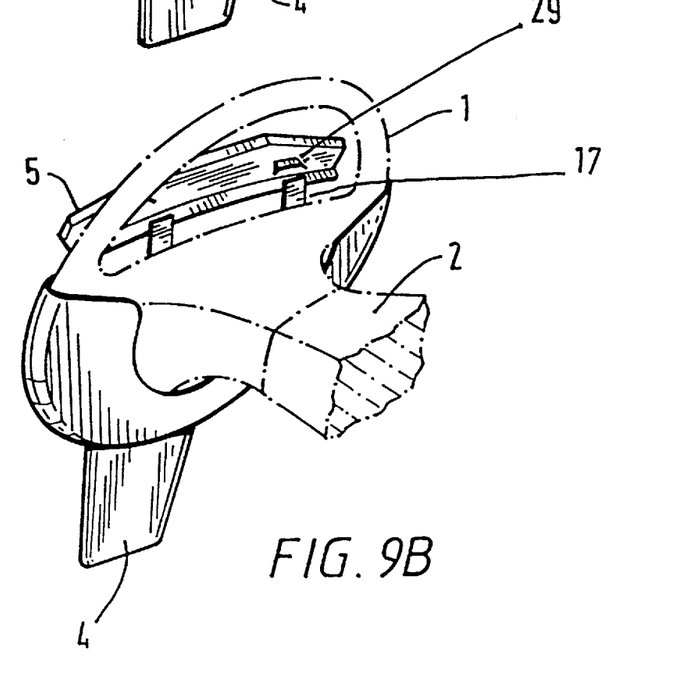

Referring now to the accompanying drawings, FIG. 1A–D shows four popular types of steering wheels with differing spoke arrangements connecting the steering wheel rim 1 to the central steering column 2 as seen in FIGS. 9A–B.

Figure 1A:
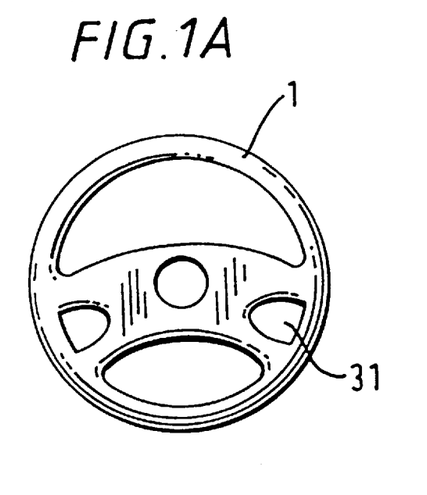
FIG. 1A–D shows several known types of steering wheel.
Figure 1B:
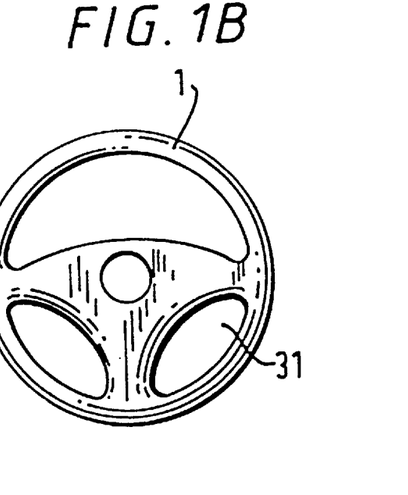
Figure 1C:
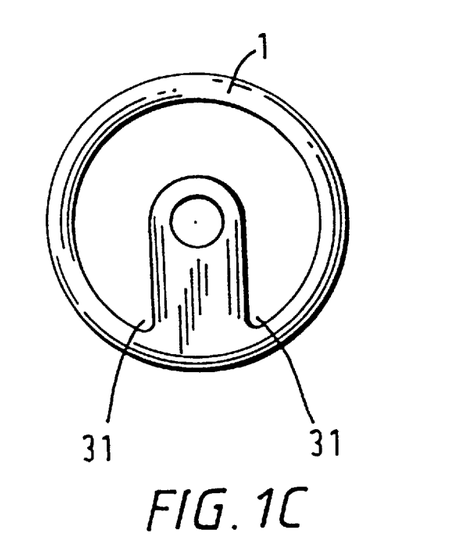
Figure 1D:
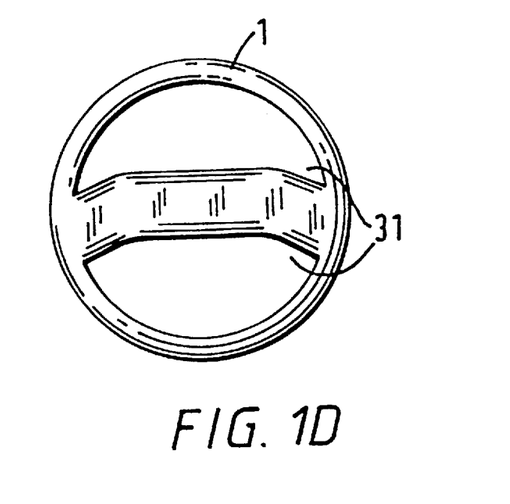
Figure 2:
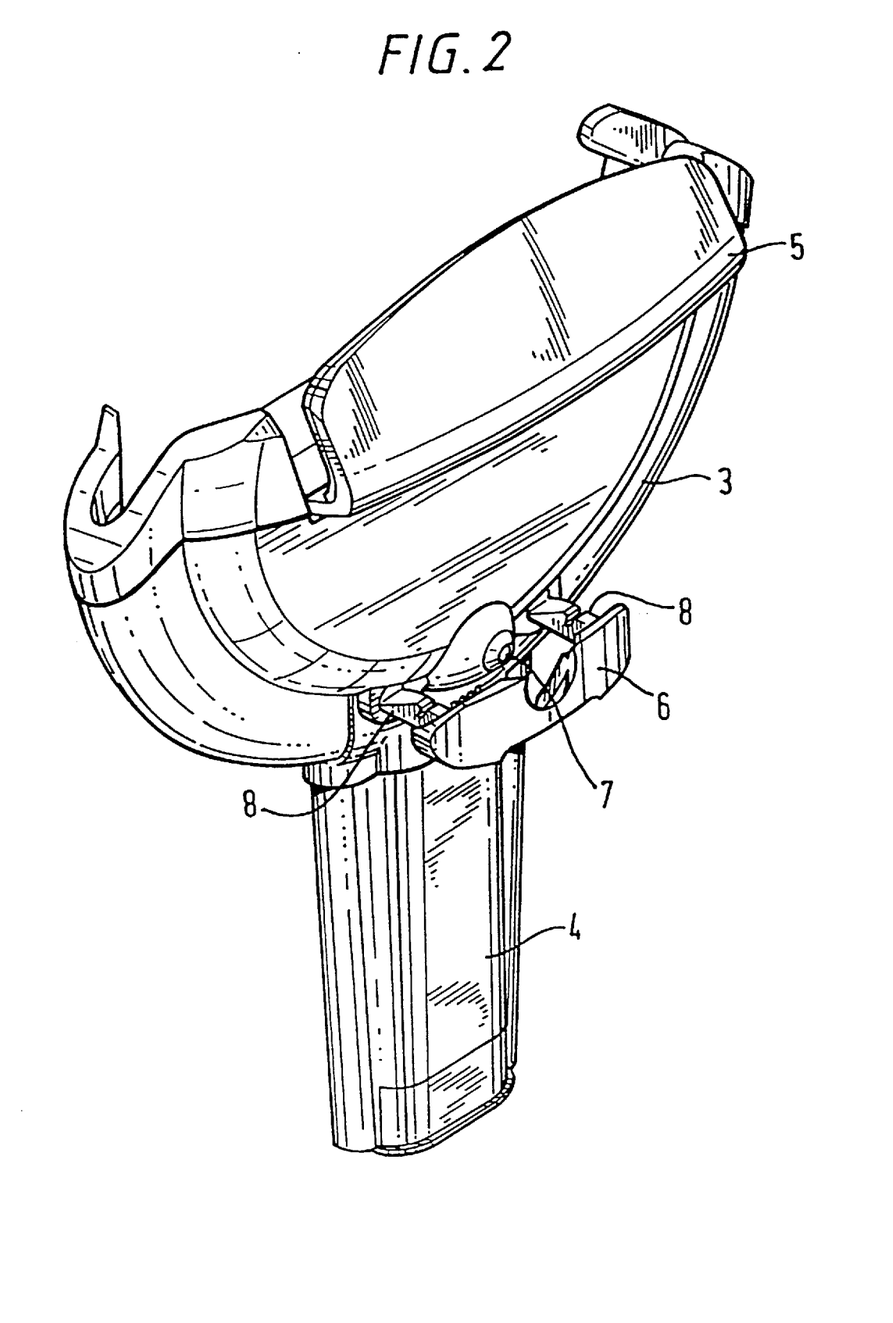
FIG. 2 is a front perspective view of one embodiment of a security device according to the present invention prior to fitting a steering wheel.
Figure 3:
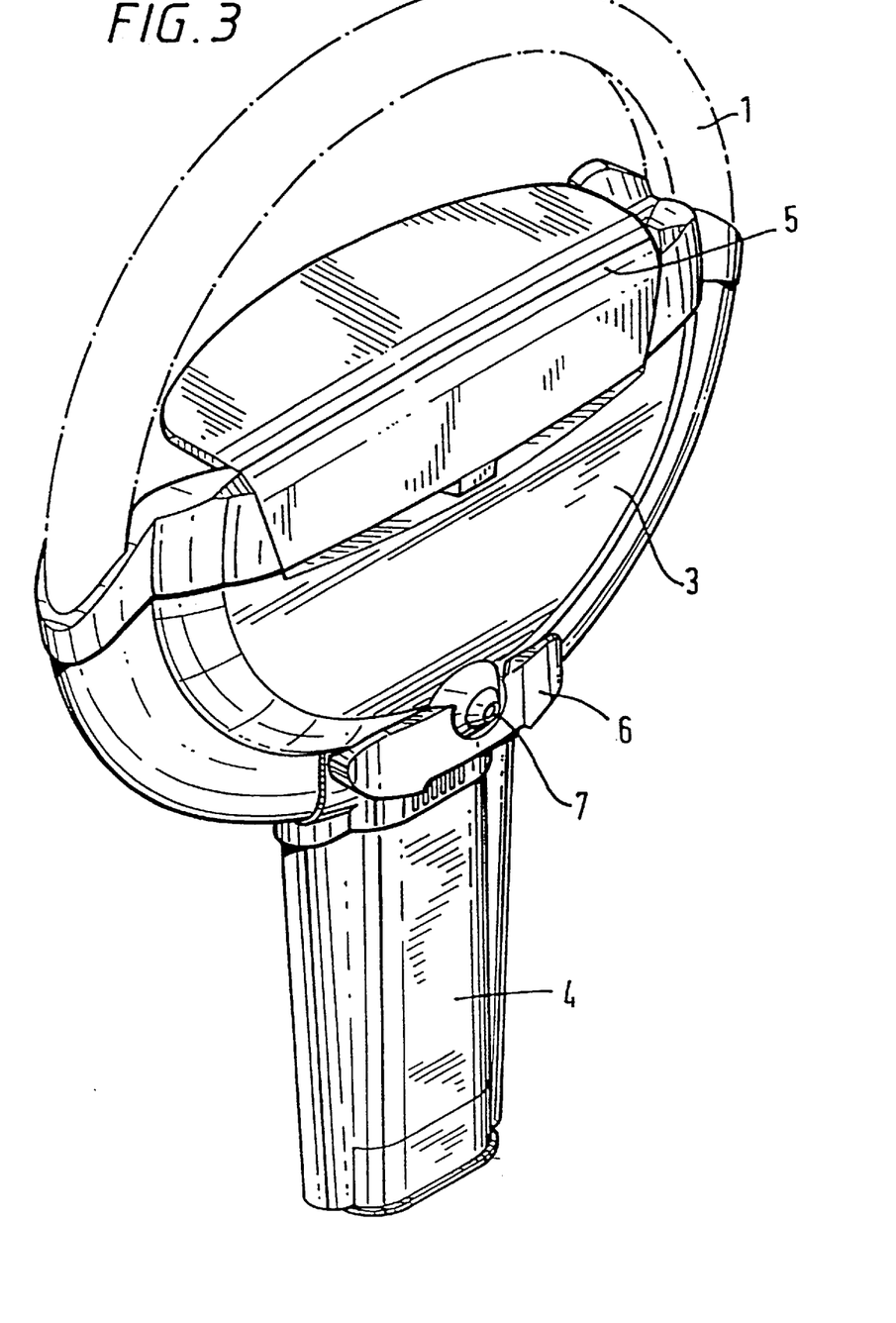
FIG. 3 shows a mounted view of the embodiment of FIG. 2.

Referring now to FIG. 2, this shows the first embodiment of the security device prior to attachment to a steering wheel. The device comprises a substantially semi-circular cover or sleeve 3 which is adapted to be slipped onto the lower half of a steering wheel, FIG. 3 of the drawings show the device of FIG. 2 mounted and locked onto a steering wheel. The main cover 3 can be made of a tough material such as stainless steel and in any case should be made from a material which can provide substantial resistance to attack by power tools.

A rigid bar 4 extends downwardly from the cover 3 so as to foul either the vehicle structure or unauthorized drivers' legs if the wheel is turned without the security device having been removed. As will be described hereinafter, when the security device is unmounted the bar 4 can be retracted within the device for ease of storage.

Figure 4:
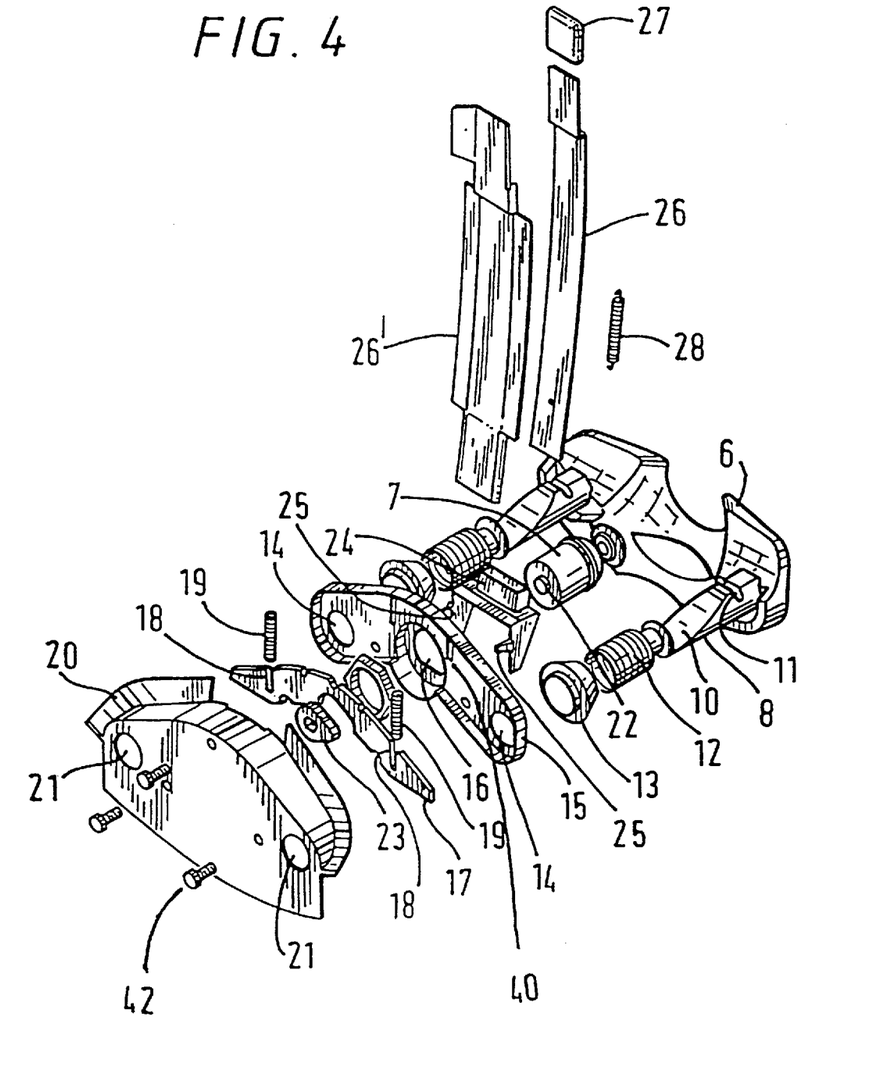
FIG. 4 is an exploded view of the locking mechanism of the embodiment of FIG. 2.

The cover 3 also carries a spring biased lid 5 made of the same attack-resistant material as the cover. Although this lid 5 is shown in an open condition in FIG. 2, it is normally spring-biased towards the operative position shown in FIG. 3. The front face of cover 3 is provided with a handle-like portion 6 and a central lock 7. The handle 6 carries at its respective ends a pair of locking pins 8, as seen in FIG. 4, which pass through aligned holes in the front of the cover. In this specification "front" will refer to that face of the security device which a driver would see when seated in the driver's seat.

Figure 5:
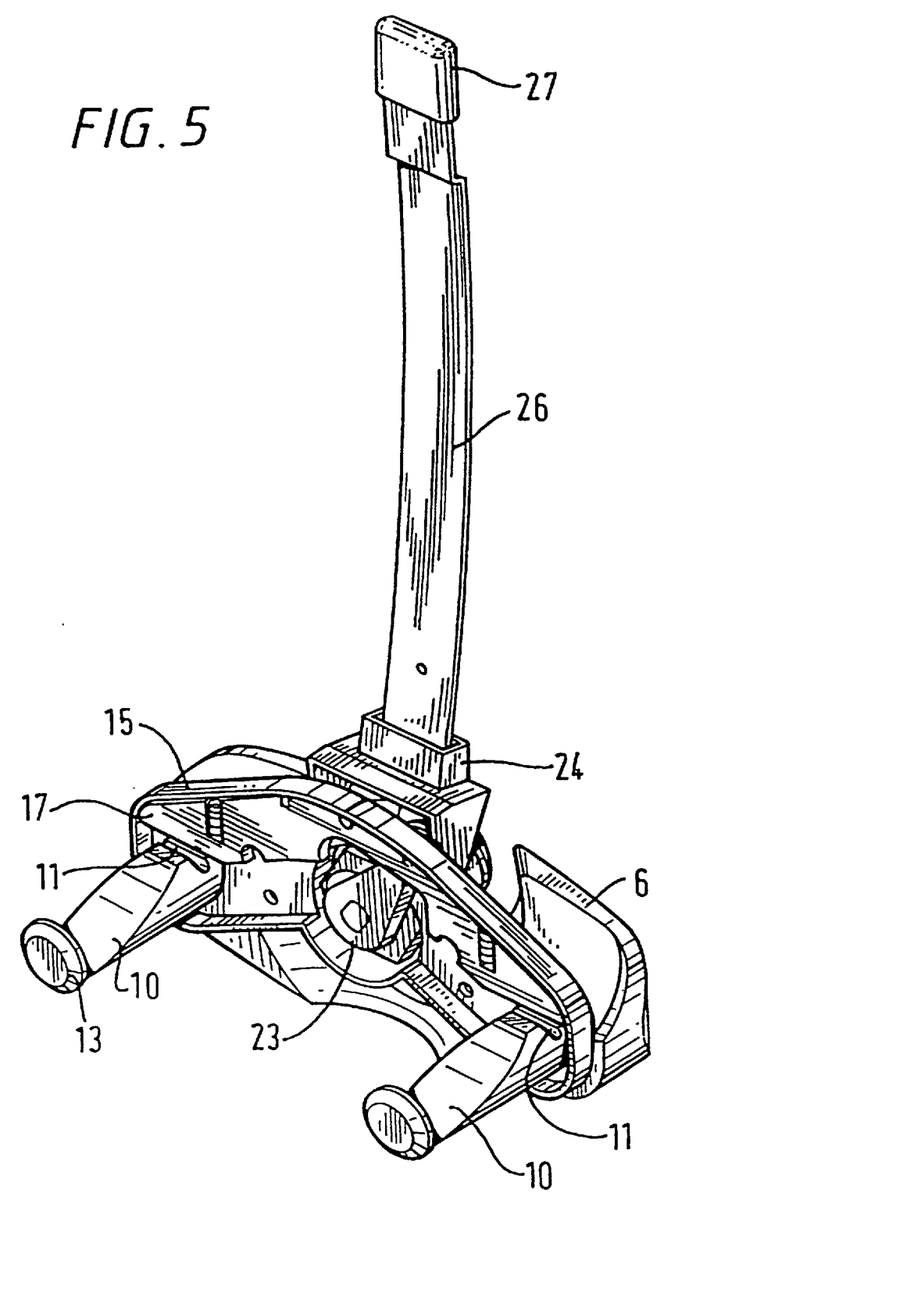
FIG. 5 is a perspective view of the locking mechanism shown in FIG. 4.

As can be seen from the exploded view of FIG. 4, each of the identical locking pins 8 has a cam-like riser portion or ramp 10 leading to an upper recess in the form of a slot 11. Each locking pin also carries a compression spring 12 and ends in a bezel 13. The diameters of the two bezels 13 are such that they cannot pass through holes 14 in a shield 15. The shield 15 has a flanged rim and a central aperture 16 through which the lock 7 extends. Mounted within the shield 15 is a lock bolt 17 having a pair of slots 18 each of which houses a compression spring 19 which cooperates with the flanged rim of the shield 15. The lock bolt 17 is held within the shield by a cover plate 20 having holes 21 through which the two locking pins can extend so as to pass on either side of a single wheel spoke when the device is mounted on a single-spoke steering wheel or between two wheel spokes of a multi-spoke steering wheel. Further, the lock bolt 17 is held within the shield 15 and the cover plate 20 through the use of fasteners 42 as seen in FIG. 4. The lock 7 has a spindle 22 carrying a lock cam 23, as shown in FIG. 5.

The operation of the security device with regard to the locking pins can now be described. It will be appreciated that while the present embodiment has both locking pins and a sprung lid it is also possible for the device to be of considerable utility without the additional expenditure necessitated by the provision of the lid and a locking mechanism (to be described hereinafter) associated with the lid.

Thus in the unused state of the security device the handle 6 is in the position shown in FIG. 2. The cover 3 is slipped over the steering wheel 1 so that the locking pins 8 will lie on either side of a single spoke or between two spokes of the wheel. Once the cover is located on the wheel the handle 6 is pressed forcing the locking pins 8 through their respective bezels 13 against the action of the compression springs 12. As a result of this movement of the pins the lock bolt 17 rises up the ramps 10 of the pins against the action of the bolt springs 19. As the locking pins are finally pushed home the lock bolt 17 is pressed into the lock slots 11 by the action of the bolt springs 19 so as to prevent withdrawal of the locking pins. If a person wishing to make an unauthorized removal of the security device cuts through the rim of the steering wheel on either side of the cover it will be appreciated that because of the locking pins engaging with the uncut portion of the rim within the cover it will still not be possible to pull the device from the wheel.

In order to demount the device a key it; inserted into the lock 7 and turned through 90°. This turns the lock cam 23 which lifts the lock bolt 17 out of the slots 11 and allows the pins 8 to be ejected by the previously compressed springs 12. FIG. 5 shows the lock bolt 17 just having been lifted from the slots 11 under the action of the lock cam 23.

The operation of the lid 5 will now be described. Again referring to the exploded view of FIG. 4, it will be seen that a substantially U-shaped member 24 straddles the central lock 7 and has a pair of tabs 25 extending front its legs which pass through registering slots 40 in the shield 15. This member will be referred to as rod guide 24. The tabs 25 engage in cooperating slots 18 on the upper surface of the lock bolt 17. The lower end of a steel spring rod 26 is mounted on rod guide 24 to slide within a rod cover 26' and the upper end of this rod is provided with a lid bolt 27. It will accordingly be appreciated that when the lock pins 8 are inserted during mounting of the device and the lock bolt 17 rises up the ramps 10 that the rod guide 24 is also moved upwardly against the action of a tension spring 28. The spring 28 extends between rod 26 and a fixed portion on the main body of the device so as to bias the rod 26 and the rod guide 24, in which the rod is seated, against upward movement.

Figure 6:
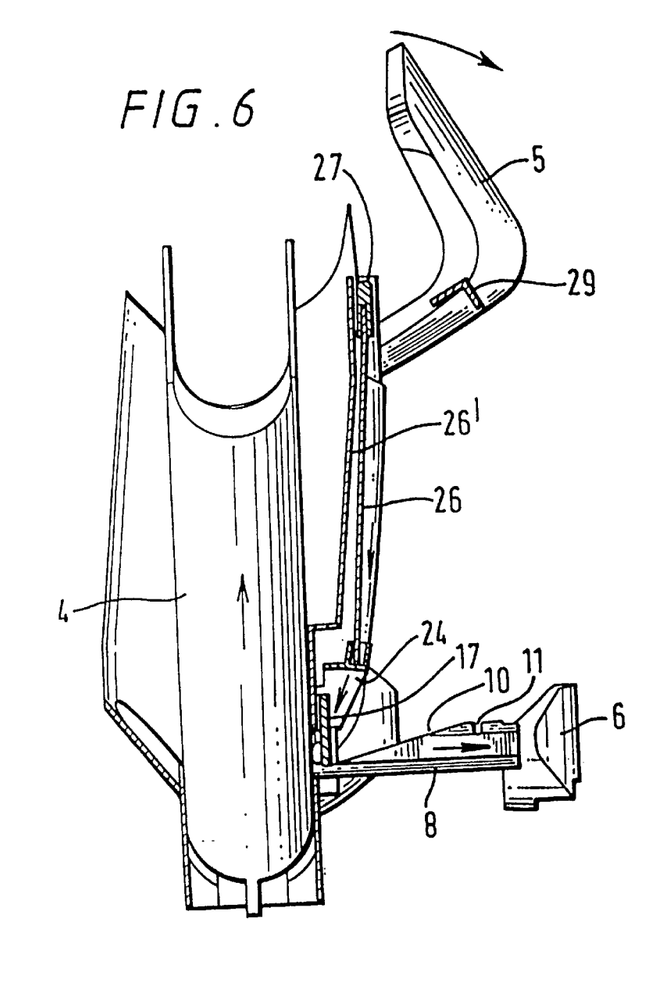
FIGS. 6 and 7 are sections through the respective embodiments of FIGS. 2 and 3.

Referring now to FIG. 6 of the drawings, this again shows the lid 5 in its open position and shows a catch 29 on the inner surface of the lid. When the locking pins 8 are in their non-operative position, as shown in FIG. 6, this catch passes over lid bolt 27 so that the lid 5 is free to pivot about its hinge. When the pins 8 are inserted into their locking position the degree of upward movement imparted to the rod guide 26 is sufficient to cause the lid bolt 27 to engage within the catch 29 so as to hold the lid in its closed position. When the locking pins 8 are released by the turning of lock cam 23 and the pins are withdrawn so that the lock bolt 17 slides down the respective ramps 10, the rod guide 24 follows the downward movement of the lock bolt under the influence of spring 28 and allows the lid bolt 27 to be disengaged from the lid catch 29. With the locking pins retracted and the lid unlatched the security device can be removed from the steering wheel.

The preceding description has been concerned with the way in which the security device can be locked onto a steering wheel. Another facet of the invention is the provision of the bar 4 which hinders use of the wheel by a would-be driver when the security device is in place.

Figure 7:
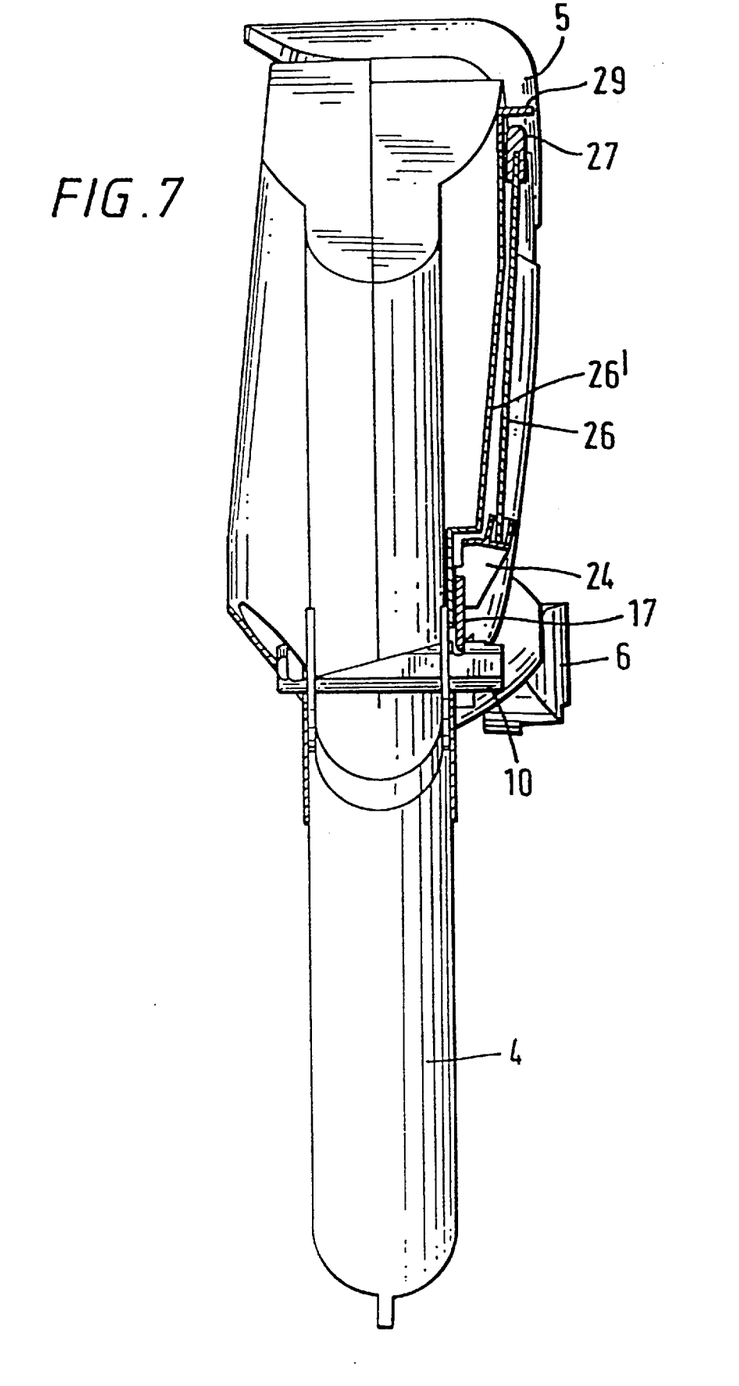
Figure 8:
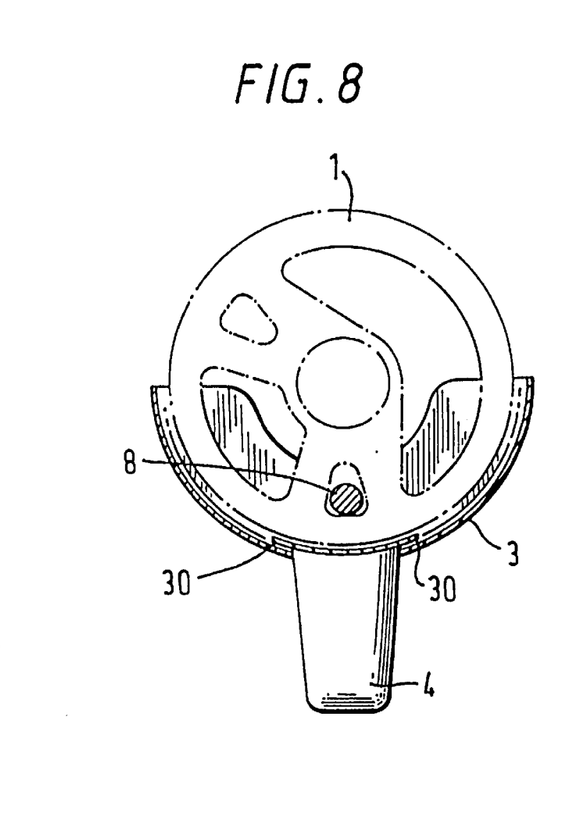
FIG. 8 is a diagrammatic section.

Again referring to FIG. 6 of the drawings this shows the bar 4 stowed within the cover 3. This figure clearly shows the lock bolt 17 in its lowest position with the rod guide 24 and rod 26 also in their retracted positions. When the security device is to be placed on a steering wheel the bar passes downwardly through an opening in the cover until further downward movement is stopped by a pair of flanges engaging the rims of the opening when the security device is mounted on a wheel upward movement of the bar is prevented by the upper end of the bar engaging the rim 1 of the steering wheel. FIGS.7 and 8 of the drawings are diagrammatic illustrations of the bar 4 in its operative position extending from the cover 3 and shows how the bar 4 is both prevented from being removed from the device by flanges 30 and from being pushed back into the device by the presence of the wheel rim 1. It will be seen that FIG. 8 shows only a single locking pin 8. An embodiment with a single pin can readily be used with a steering wheel of the kind shown at FIG. 1A where the pin can be passed through the spoke opening 31. It can also be used with a wheel of the kind shown at FIG. 1B. The important factor is that the presence of the locking pin prevents rotation of the security device relative to the steering wheel to such an extent that the spoke covered by the security device is not exposed to attack. With steering wheels of the type shown in FIG. 1C and 1D the two locking pin embodiment is preferred. In all cases the pins should be located in use, at positions indicated at 31.

FIGS. 9A and 9B of the drawings are views showing how the security device and in particular the lid 5 cooperate with a steering column 2. FIG. 9B shows the provision of two lid bolts 17 arranged to cooperate with a pair of catches 29 on the lid so as to provide even greater security against forcible removal of the device at least access to the nut which holds the steering wheel onto the column. It will be appreciated that the lid can also act as a rotation limiter and locking device against the removal of the device once mounted on a steering wheel. To achieve this the lid geometry must be such that it abuts the top of the steering column when the cover is pulled in the intended direction of authorized removal. Additionally if the cover is rotated relative to the wheel the closed lid abuts the upper surfaces of the upper spokes thus limiting rotation and securing the device without the use of the locking pins. This method of locking the security device would be particularly feasible if the security device was accurately tailored for use with a particular model.

In the embodiment which has just been described the movement of the lock bolt 17 is spring-biased. Thus in the situation where the lock bolt 17 is engaged in the slots 11 in the locking pins it is conceivable that severe blows to the device could cause the lock bolt to be shifted out of engagement with the slots 11 so as to release the locking pins 8 and the lid 5.

Figure 10A:
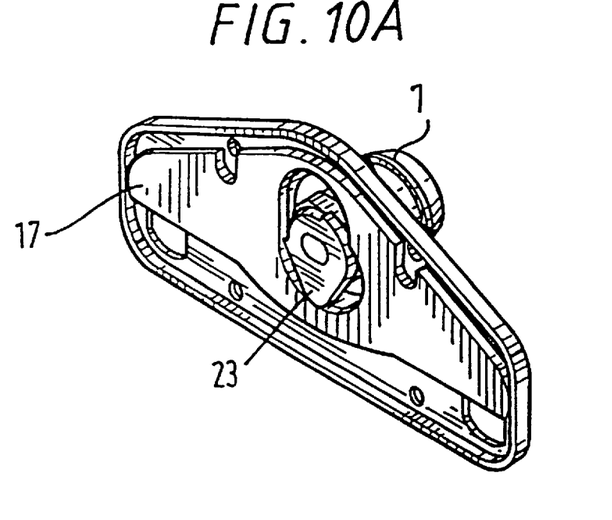
FIGS. 10A–C shows a detail of a third embodiment.
Figure 10B:
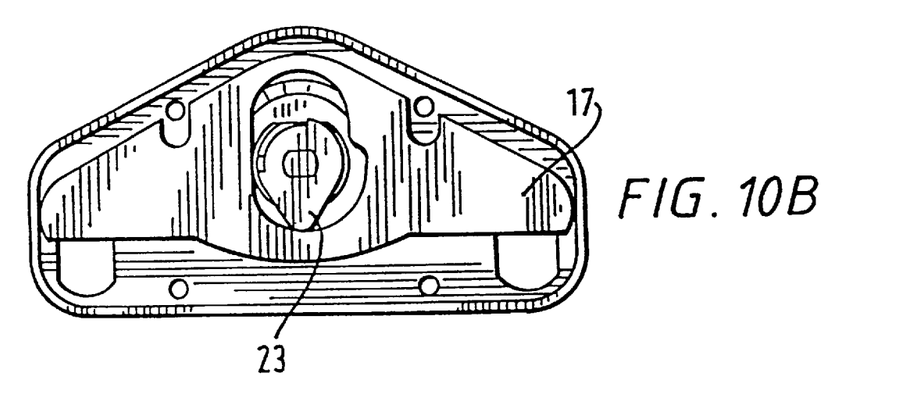
Figure 10C:
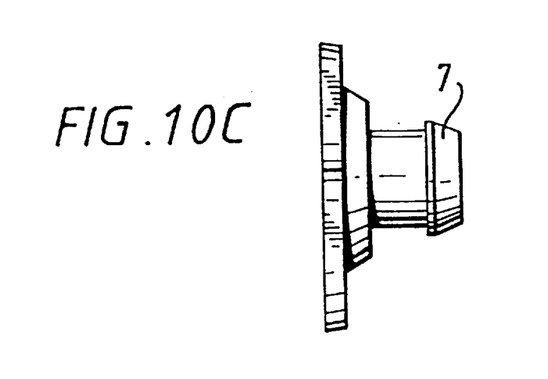
Figure 11A:
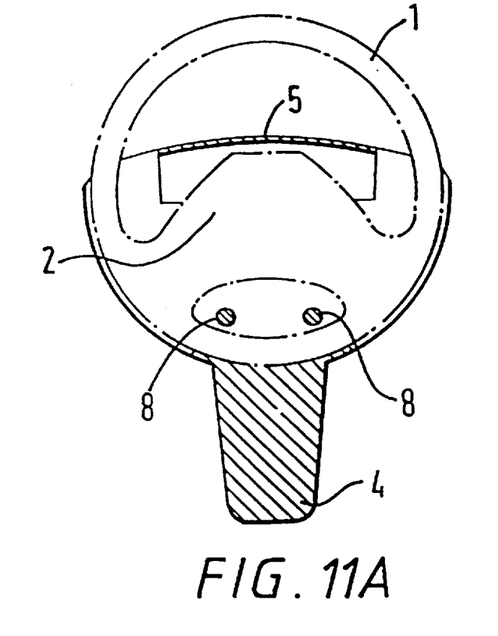
FIGS. 11 shows combinations of steering wheels with an embodiment of a security device according to the present invention.
Figure 11B:
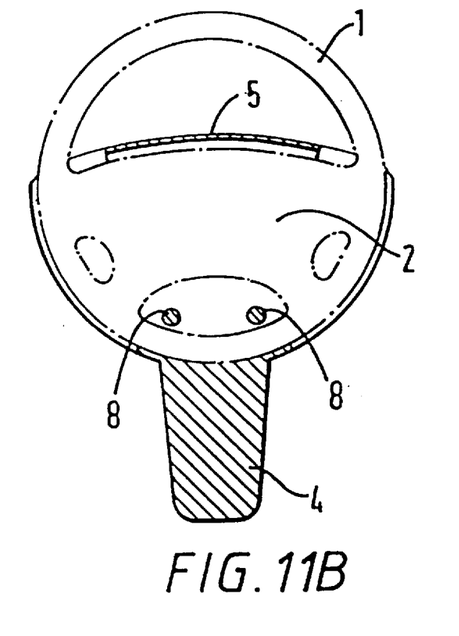
Figure 11C:
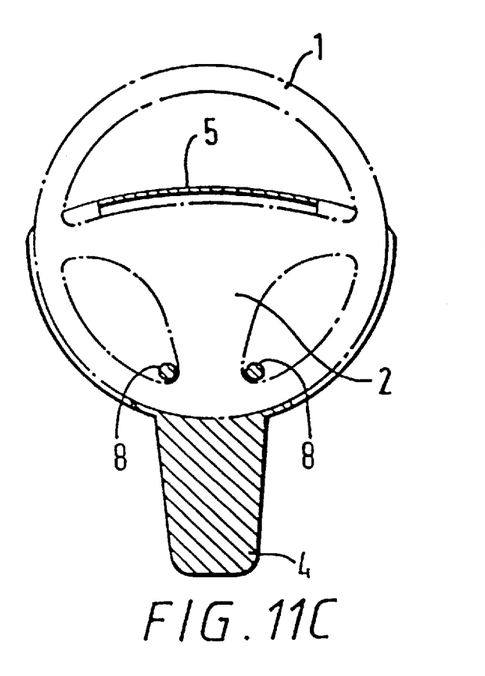
Figure 11D:
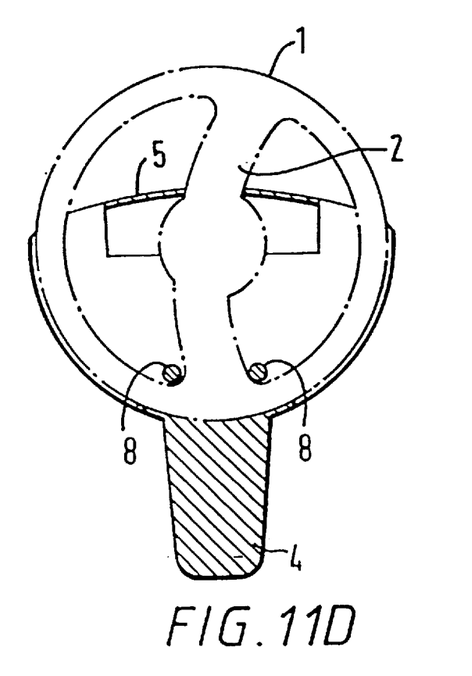

FIG. 10A–C shows a variant of the spring loaded lock bolt arrangement described with reference to FIGS. 4 and 5, with FIG. 10C being a side view. Integers which are common to the two embodiments have been given the same reference numerals. In this embodiment the springs 19 have been omitted so that the lock bolt 17 is no longer held in slots 11 by their pressure. Instead the lock cam 23 is arranged so that after the locking pins, which are substantially identical to the embodiment of FIGS. 2 to 7, have been inserted into their operative positions on either side of a spoke and the lock bar is engaged in the slots 11, the lock cam 23 is turned by the key so as to obstruct any upward movement of the lock bar to release the pins.

As will be appreciated from the foregoing description the cover in all of the embodiments described is designed to protect at least one spoke of a steering wheel so that if the steering wheel is cut at any of its exposed portions the cover can still not be removed from the wheel. In order to achieve this rotation of the cover relative to the spoke being protected has to be prevented. Preferably both a locking pin arrangement and a lid arrangement will be used, but the present invention is intended to cover arrangement in which such relative rotation is prevented by the use alone of either a locking pin or pins or a lid-like member engaging the hub of the steering column on which the device is mounted.

FIG. 11 of the drawings is similar to FIG. 1 in that it shows four different types of steering wheel in current use. In this figure a security device similar to that described with reference to FIG. 2 is shown mounted on each wheel in such a manner as to illustrate how the locking pins cooperate with the spokes of the wheels both to prevent rotation of the security device relative to the wheel and to prevent withdrawal of the device from the wheel even if the rim 1 of the wheel has been completely cut through at points outside the extent of the cover 3 as the pins will engage the inner circumference of the rim 1 which is protected by the cover 3. It will be appreciated that as the cover is made from extremely robust material such as high grade steel it would be very difficult for a potential thief to be able to cut the cover in such a way as to enable the locking pins 8 to be pulled past the remaining portion of the wheel rim.

I claim:

1. A security device, having an operative position and a position for storage, for mounting on a steering wheel of a motor vehicle comprising:

a substantial semi-circular cover adapted to be fitted over a portion of the steering wheel of the vehicle including at least one spoke so as to render the cover irremovable by cutting any combination of the uncovered portions of said steering wheel;

a lid member which is adapted to engage a hub of the steering wheel and also acts to protect the hub;

means operative to engage at least one spoke of the steering wheel rim;

means for locking the lid member in engagement with the hub;

a spring-biased lock bolt; and two locking pins adapted to be passed on either side of the spoke protected by the cover and each having formed therein a recess, wherein each locking pin is moved from a retracted and inoperative position into a locking position, the spring-biased lock bolt is raised by a ramp, the lock bolt in its locking position cooperating with the recesses in the pins so as to prevent retraction of the pins.

2. A device according to claim 1, and further comprising means for inhibiting a driver comprising a bar-like member which when the device is mounted on a steering wheel projects from the cover so as to foul an unauthorized driver's legs or said vehicle on rotation of the wheel in order to hinder use of the steering wheel by a would-be driver when said security device is in its operative position.

3. A security device, having an operative position and a position for storage for mounting on a steering wheel of a motor vehicle the steering wheel having at least one spoke, comprising:

a cover adapted to be fitted over a portion of the rim of the steering wheel of the vehicle and over at least one spoke;

a locking member in operation engageable with the steering wheel for preventing rotation of the device relative to the steering wheel rim to prevent exposure of the spoke protected by the cover;

means for inhibiting a driver from using the steering wheel when the security device is mounted on the wheel, and wherein said cover defines an arcuate recess which in operation encloses a substantially semi-circular portion of the rim of the steering wheel, the arrangement being such that when the security device is mounted on a steering wheel it is irremovable by cutting any combination of the uncovered portion of the steering wheel; and including two locking pins adapted to be passed on either side of the spoke protected by the cover, wherein each locking has a ramp portion so that when the pin is moved from a retracted and inoperative position into a locking position a spring-biased lock bolt is raised by the ramp, the lock bolt in its locking position cooperating with a recess in each pin as to prevent retraction of the pin.

4. A device according to claims 3 including a key adapted to raise each the lock bolt to free the locking pins for retraction.

* * * * *